United States Patent
Tachiiwa et al.

(10) Patent No.: US 7,207,704 B2
(45) Date of Patent: Apr. 24, 2007

(54) VEHICULAR LAMP

(75) Inventors: Takeyuki Tachiiwa, Shizuoka (JP); Manbu Maeda, Shizuoka (JP); Koichi Nakamura, Shizuoka (JP); Fujio Onuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/265,012

(22) Filed: Nov. 2, 2005

(65) Prior Publication Data

US 2006/0092653 A1 May 4, 2006

(30) Foreign Application Priority Data

Nov. 4, 2004 (JP) .............................. 2004-320505

(51) Int. Cl.
*F21V 17/02* (2006.01)

(52) U.S. Cl. ...................... 362/512; 362/513; 362/514; 362/515

(58) Field of Classification Search ......... 362/512–515
See application file for complete search history.

(56) References Cited

U.S. PATENT DOCUMENTS 5,197,799 A * 3/1993 Dehaene ................. 362/420
5,673,993 A * 10/1997 Fukui ...................... 362/463
2003/0117810 A1* 6/2003 Nakazawa et al. .......... 362/515

FOREIGN PATENT DOCUMENTS

| JP | 7-14502 | 3/1995 |
| JP | 7-27004 | 5/1995 |
| JP | 11-139203 | 5/1999 |

* cited by examiner

*Primary Examiner*—Stephen F Husar
*Assistant Examiner*—Meghan K. Dunwiddie
(74) *Attorney, Agent, or Firm*—Koda & Androlia (57) ABSTRACT

A vehicular lamp having a distance adjustment section that adjusts the distance between the lamp body and the reflector and includes an adjustment shaft, a gear member, and a receiving element. The adjustment shaft has a spherical end; the gear member includes a shaft portion that has the adjustment shaft therein, elastic pawls protruding from the shaft portion, and empty spaces defined by the elastic pawls to allow flexure of the elastic pawls toward the shaft portion; and the receiving element is formed on the back surface of the reflector. The gear member having the adjustment shaft is rotatably inserted in an insertion hole of the lamp body, the elastic pawls are engaged with the edge of the insertion hole to prevent the gear member from slipping out; and the spherical end of the adjustment shaft is engaged with the receiving element and prevented from rotating.

5 Claims, 10 Drawing Sheets

VEHICULAR LAMP

BACKGROUND OF THE INVENTION

1. Field of the Invention

The present invention relates to a vehicular lamp and more specifically to a vehicular lamp that has a reflector tiltable with respect to a lamp body and has an improved assemblability of the reflector and lamp body.

2. Description of the Related Art

In one of the known vehicular lamps, a reflector that holds a light source is tiltably supported by a lamp body, and the reflector is tilted by turning an aiming screw, which connects the lamp body and the reflector, from the back of the lamp body using a screwdriver or the like.

Japanese Utility Model Application Laid-Open (Kokai) No. 7-27004 discloses a vehicular headlamp of the type described above.

In the vehicular headlamp of Japanese Utility Model Application Laid-Open (Kokai) No. 7-27004, an aiming screw that has an umbrella gear integrally formed on the rear end is rotatably installed in the lamp body, and the tip end of the aiming screw is screwed into a synthetic resin nut that is installed in the reflector. The aiming screw is rotated using, for instance, a Phillips-head screwdriver with the tip end of the screwdriver meshed with the umbrella gear. The aiming screw is screwed into and out of the synthetic resin nut depending on the direction of the rotation, so that the distance between the reflector and the lamp body is changed.

The assembly of the reflector to the lamp body in the vehicular headlamp of Japanese Utility Model Application Laid-Open (Kokai) No. 7-27004 is performed in a two-step operation. First, the aiming screw is inserted into the lamp body from the back; a fix is pushed onto the aiming screw, thus allowing the aiming screw to be rotatably supported by the lamp body; and then, a reflector to which a synthetic resin nut is attached is set in a jig; and the aiming screw is turned and screwed into the synthetic resin nut until it reaches a predetermined position.

In the vehicular headlamp disclosed in Japanese Utility Model Application Laid-Open (Kokai) No. 7-27004, in order to assemble the reflector to the lamp body, a process of pushing the fix onto the aiming screw to rotatably install the aiming screw by the lamp body is first necessary. In order to push the fix onto the aiming screw, a fairly large size device is required, resulting in an increase in size of the assembly apparatus.

Furthermore, the distance between the reflector and the lamp body is set by the aiming screw which is screwed into the synthetic resin nut until a predetermined position, so that the tilt of the reflector with respect to the lamp body is, as a result, set to a predetermined state (or to a predetermined angle). Therefore, it is necessary to turn the aiming screw to be screwed into the synthetic resin nut until it reaches a predetermined position while the reflector to which the synthetic resin nut is attached is set in a jig. This process of screwing in the aiming screw, however, takes time, which means that the process of assembling the reflector to the lamp body takes time.

BRIEF SUMMARY OF THE INVENTION

In view of the foregoing problems, it is an object of the present invention to provide a vehicular lamp in which the process of assembling a reflector to a lamp body is simplified.

The above object is accomplished by a unique structure of the present invention for a vehicular lamp in which the distance between the reflector and the lamp body is adjusted by aiming mechanisms that include a distance adjustment section so that the angle of the reflector with respect to the lamp body can be altered; and in the present invention:

the distance adjustment section is comprised of an adjustment shaft, a gear member, and a receiving element, wherein the adjustment shaft is comprised of a threaded shaft portion and a spherical end portion integrally formed on the tip end of the threaded shaft portion;

the gear member is comprised of:

a shaft portion which is open at the front end and in which a thread groove that meshes with the threaded shaft portion of the adjustment shaft is formed on the inner periphery of the shaft portion, a gear portion which is formed integrally on the rear end of the shaft portion, at least two elastic pawls which protrude from the outer peripheral portion of the shaft portion, and an empty space which is defined by the pawl and formed on the shaft portion so as to allow flexure of the elastic pawls in the direction toward the shaft portion; and the receiving element is formed on the back surface of the reflector; and wherein the gear member is rotatably inserted in an insertion hole formed in the lamp body with the threaded shaft portion of the adjustment shaft meshed with the thread groove of the shaft portion, and with the elastic pawls engaged with the front end edge of the insertion hole, thus preventing the gear member from slipping out of the lamp body; and the spherical end portion of the adjustment shaft is received by the receiving element so that the spherical end portion is prevented from rotating about the axis of the threaded shaft portion.

With the above-described construction of the present invention, the adjustment shaft screwing-in process at the time of assembling the reflector to the lamp body of a vehicular lamp can be omitted.

More specifically, the vehicular lamp of the present invention is comprised of a container-shaped lamp body, a lens that covers the front face or the front opening of the lamp body, a reflector that has a light source and is provided between the lamp body and the lens, and an aiming mechanism that tiltably supports the reflector with respect to the lamp body; and the aiming mechanism includes at least one rotational fulcrum section and at least one distance adjustment section, the reflector is provided in the lamp body so as to be rotatable at the rotational fulcrum section, and the reflector and the lamp body are connected such that the distance therebetween is adjustable at the distance adjustment section; and in the present invention:

the distance adjustment section is comprised of an adjustment shaft, a gear member, and a receiving element, wherein the adjustment shaft is comprised of a threaded shaft portion and a spherical end portion which is integrally formed on the tip end of the threaded shaft portion;

the gear member is comprised of:

a shaft portion which is open at the front end and in which a thread groove that meshes with the threaded shaft portion of the adjustment shaft is formed on the inner periphery thereof, a gear portion which is formed integrally on the rear end of the shaft portion, at least two elastic pawls which protrude from the outer peripheral portion of the shaft portion, and an empty space which is defined by the pawl and formed on the shaft portion so as to allow flexure of the elastic pawls in the direction toward the shaft portion; and the receiving element is formed on the back surface of the reflector; and wherein the gear member is rotatably inserted in an insertion hole formed in the lamp body with the threaded shaft portion of the adjustment shaft meshed with the thread groove of the shaft portion, and with the elastic pawls engaged with the front end edge of the insertion hole, thus preventing the gear member from slipping out of the lamp body; and the spherical end portion of the adjustment shaft is received by the receiving element so that the spherical end portion is prevented from rotating about the axis of the threaded shaft portion.

Accordingly, in the vehicular lamp of the present invention, the elastic pawls on the shaft portion of the gear member are allowed to flex in the direction toward the shaft portion by the empty space formed on the outer peripheral surface of the shaft portion. As a result, the shaft portion of the gear member can be inserted into the insertion hole of the lamp body with the threaded shaft portion of the adjustment shaft meshed with the thread groove of the shaft portion of the gear member. Therefore, the threaded shaft portion of the adjustment shaft can be brought into mesh with the shaft portion of the gear member up to a predetermined position in advance, i.e., before assembling the reflector to the lamp body; and then with the adjustment shaft being in mesh with the gear member, the adjustment shaft is held by the lamp body by simply inserting the shaft portion of the gear member into the insertion hole of the lamp body from the back. Accordingly, a large sized device conventionally required for pushing on the fix is unnecessary in the vehicular lamp of the present invention.

Also, the reflector and the lamp body can be easily connected by the gear member, adjustment shaft and receiving element. This is done by simply setting the gear member having the adjustment shaft in the lamp body, positioning the spherical end portion of the adjustment shaft to the receiving element of the reflector, and then pushing the reflector toward the lamp body, thus allowing the spherical end portion of the adjustment shaft to be received by and engaged with the receiving element of the reflector.

Furthermore, in the vehicular lamp of the present invention:

the reflector is formed of a material that has elasticity, the receiving element of the reflector is comprised of two wall portions, which protrude from the back surface of the reflector and positioned substantially parallel to each other, and an opening, which extends in substantially one direction and is formed between eave portions that protrude toward each other from the rear end of the two wall portions;

the spherical end portion of the adjustment shaft has at least two protrusions that protrude in a direction intersecting the axis of the threaded shaft portion; and the spherical end portion is received by the receiving element through the opening between the two wall portions, and the protrusions of the spherical end portion interfere with or engaged with the wall portions.

With this construction, the rotation of the spherical end portion of the adjustment shaft is prevented by a simple structure, and the spherical end portion is allowed to move in the direction in which the two wall portions of the receiving element extend. As a result, a slight positional offset between the receiving element and the spherical end portion due to tilting of the reflector with respect to the lamp body can be absorbed by the movement of the spherical end portion, and smooth tilting of the reflector with respect to the lamp body is ensured.

In the vehicular lamp of the present invention, a coating made from an elastomer can be integrally formed on the outer peripheral surface of the shaft portion of the gear member. With this elastomer coating, the vehicular lamp of the present invention has an assured water-proof capability between the gear member and the lamp body without increasing the number of parts.

Furthermore, in the vehicular lamp of the present invention, a stepped surface that faces forward can be formed near the rear end of the shaft portion of the gear member so that the stepped surface extends the entire periphery of the shaft portion, and a seal body formed from an elastomer can be integrally provided on the entire periphery of the stepped surface so that the seal body is in contact with the stepped surface. With this construction, the vehicular lamp of the present invention has an assured water-proof capability between the gear member and the lamp body without increasing the number of parts.

Alternatively, in the vehicular lamp of the present invention, a stepped surface which faces forward can be formed near the rear end of the shaft portion of the gear member so that the stepped surface extends the entire periphery of the shaft portion, and an o-ring can be attached to the stepped surface so that the o-ring is in contact with the stepped surface. With this construction, the vehicular lamp of the present invention has an assured water-proof capability between the gear member and the lamp body with a simple structure.

Furthermore, in the vehicular lamp of the present invention, the adjustment shaft can be formed of metal or a resin material which differs from the resin material for the gear member, and the adjustment shaft and the gear member is integrally formed by insert molding in which the material resin for the gear member is injected with at least a portion of the threaded shaft portion of the adjustment shaft inserted in a molding die for the gear member. Accordingly, the process of screwing the adjustment shaft into the shaft portion of the gear member becomes unnecessary, and the process of assembling the reflector to the lamp body becomes even simpler.

DETAILED DESCRIPTION OF THE INVENTION

Hereinafter, embodiments of the vehicular lamp according to the present invention will be described with reference to the accompanying drawings. The embodiment will be described for a vehicular headlamp.

Figure 1:
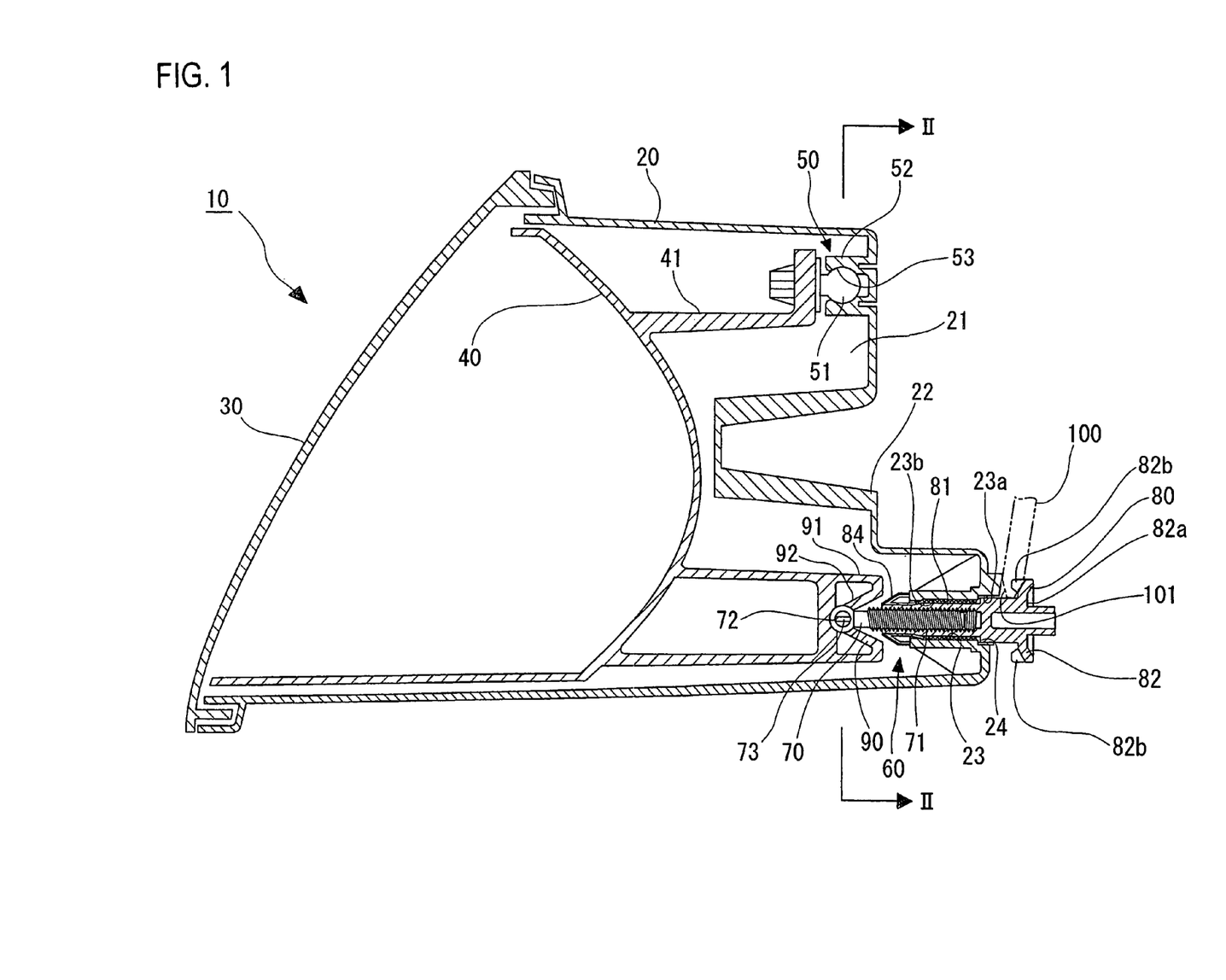
FIG. 1 shows the vehicular lamp according to one embodiment of the present invention, being a vertical cross-sectional view of the main portion of the lamp taken at a location parallel to the optical axis of the lamp.

The vehicular headlamp 10 of the present invention comprises a lamp body 20 which is container shaped and has a concave area 21 having an opening at the front, a lens 30 attached to the lamp body 20 to cover the opening (or the front opening) of the concave area 21 of the lamp body 20, and a reflector 40 installed in a tiltable manner in the concave area 21 with its opening covered by the lens 30. A light source such as an incandescent bulb or a discharge bulb, not shown, is disposed on the reflector 40; and thus, the direction of radiation of the light form the light source is changed by tilting the reflector 40 with respect to the lamp body 20.

The reflector 40 is tiltably provided with respect to the lamp body 20 by an aiming mechanism comprising three connecting section: a single rotational fulcrum section 50 and two distance adjustment sections 60. The rotational fulcrum section 50 aims the reflector 40 in all directions in the lamp body 20. The distance adjustment sections 60 support the reflector 40 in the lamp body 20 so that the distance between the reflector 40 and the lamp body 20 is adjusted at those portions.

Figure 2:
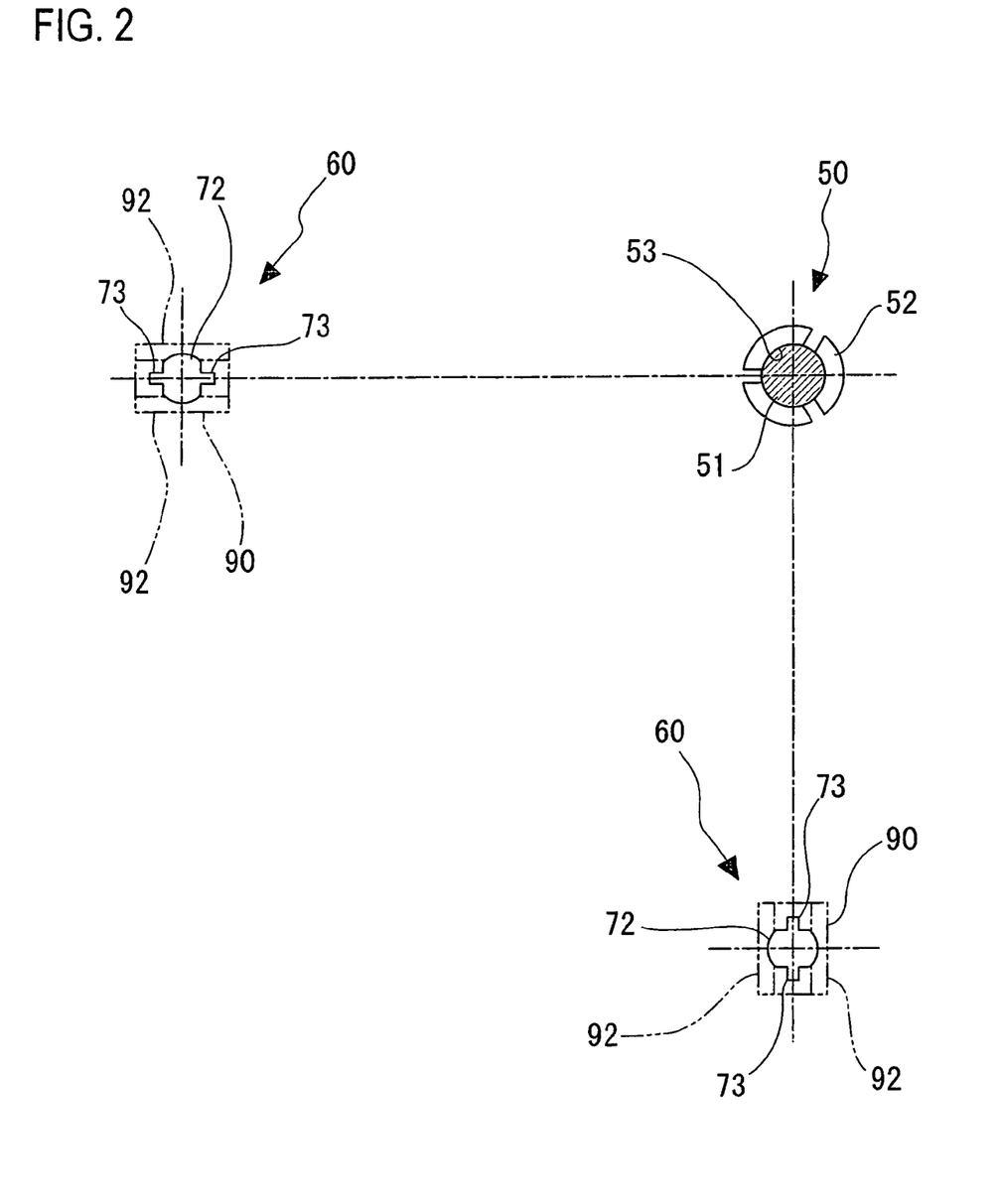
FIG. 2 is a cross-sectional view of the main portion of the lamp taken along the line II—II in FIG. 1, showing one arrangement example of the connection between the reflector and the lamp body.
Figure 3:
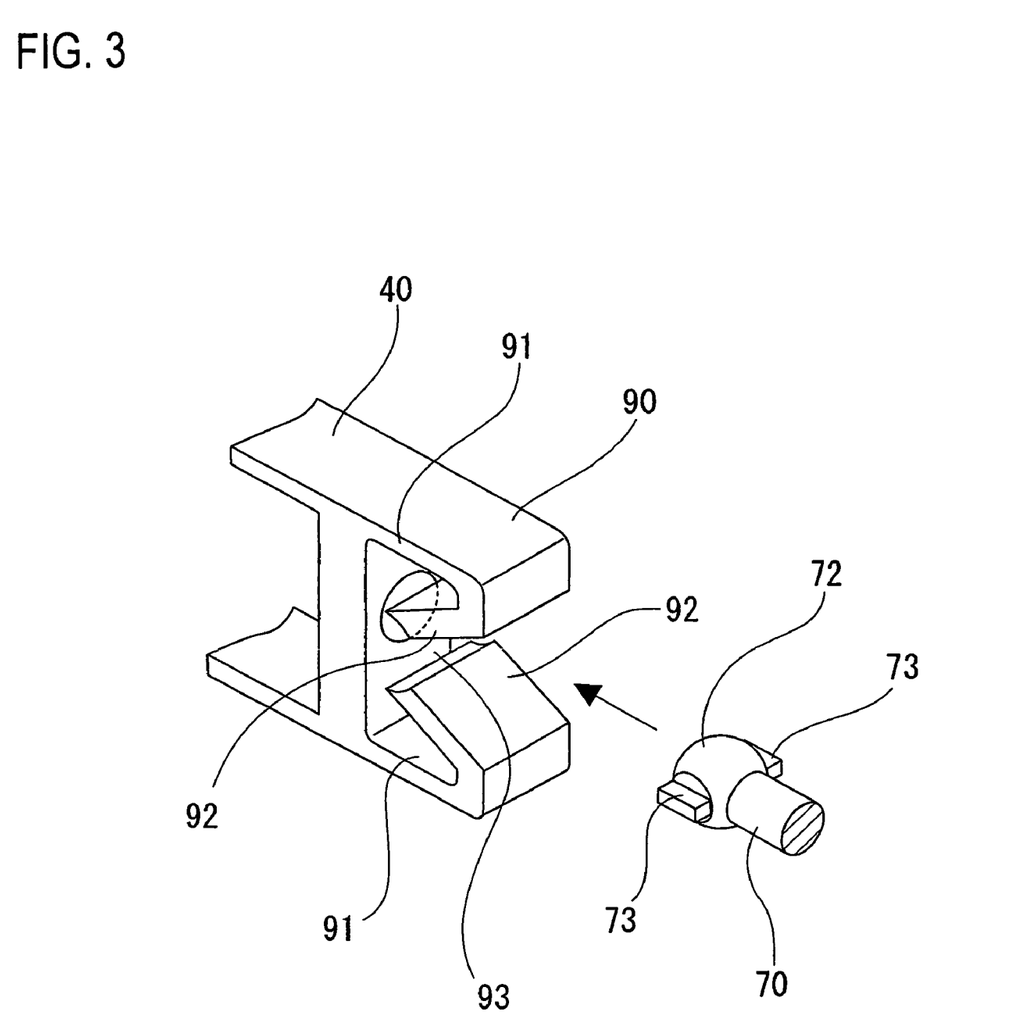
FIG. 3 is a schematic perspective view of the spherical end portion of the adjustment shaft to be received by the receiving element of the reflector in the vehicular lamp of the present invention.

FIG. 2 shows one arrangement example of the three connecting sections.

Viewed from the front, the reflector 40 and the lamp body 20 are connected at one location, which is the upper right location, by the rotational fulcrum section 50, and at two locations, which are the lower right and the upper left locations, by the distance adjustment sections 60. When the distance between the reflector 40 and the lamp body 20 is adjusted at the lower right distance adjustment section 60, the reflector 40 tilts in the vertical direction about the horizontal line that connects the rotational fulcrum section 50 and the upper left distance adjustment section 60. When the distance between the reflector 40 and the lamp body 20 is adjusted or changed at the upper left distance adjustment section 60, then the reflector 40 tilts in the lateral direction about the vertical line that connects the rotational fulcrum section 50 and the lower right distance adjustment section 60.

Figure 4:
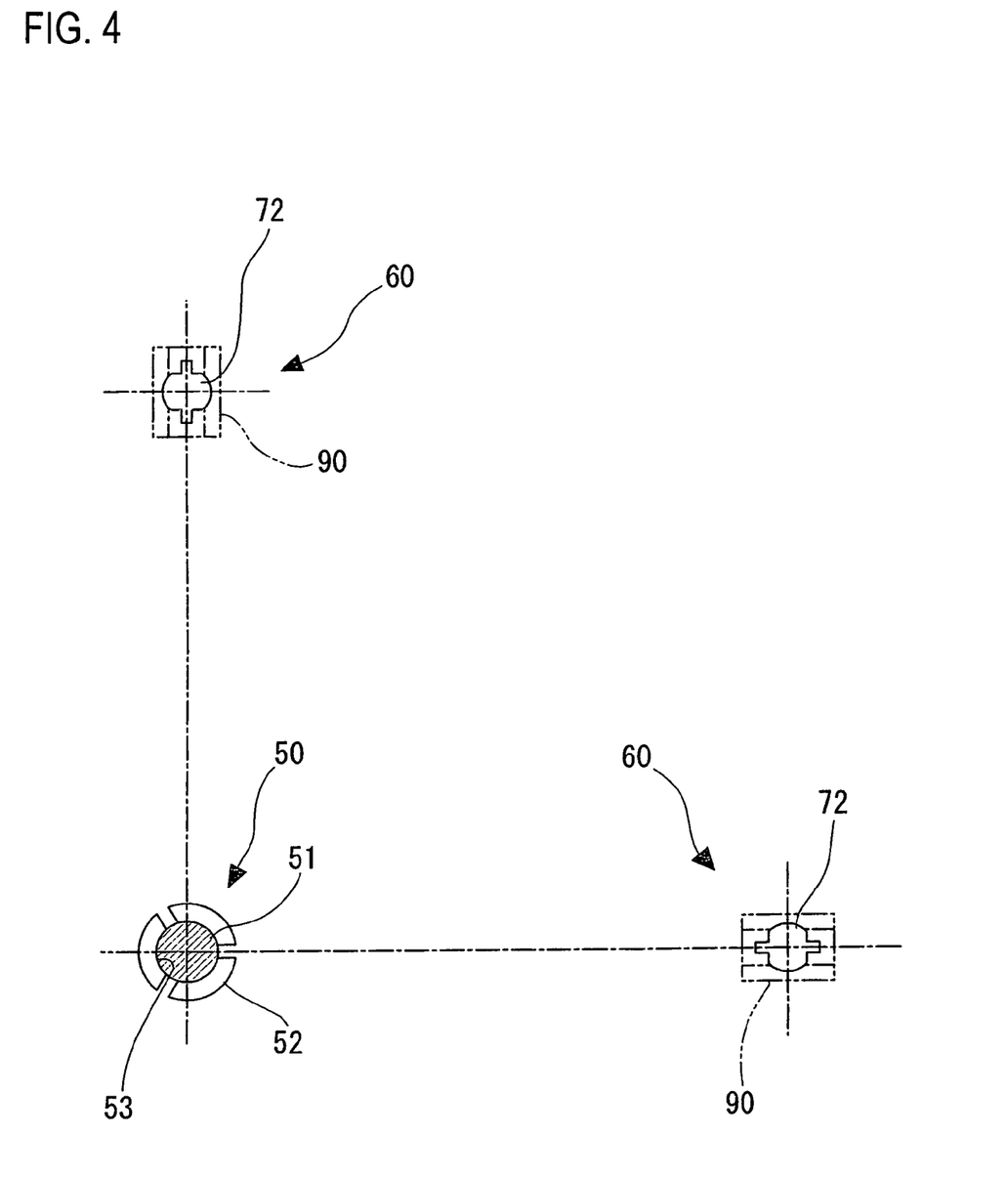
FIG. 4 is a cross-sectional view of another arrangement example of the connection between the reflector and the lamp body taken at the same portion as in FIG. 2.
Figure 5:
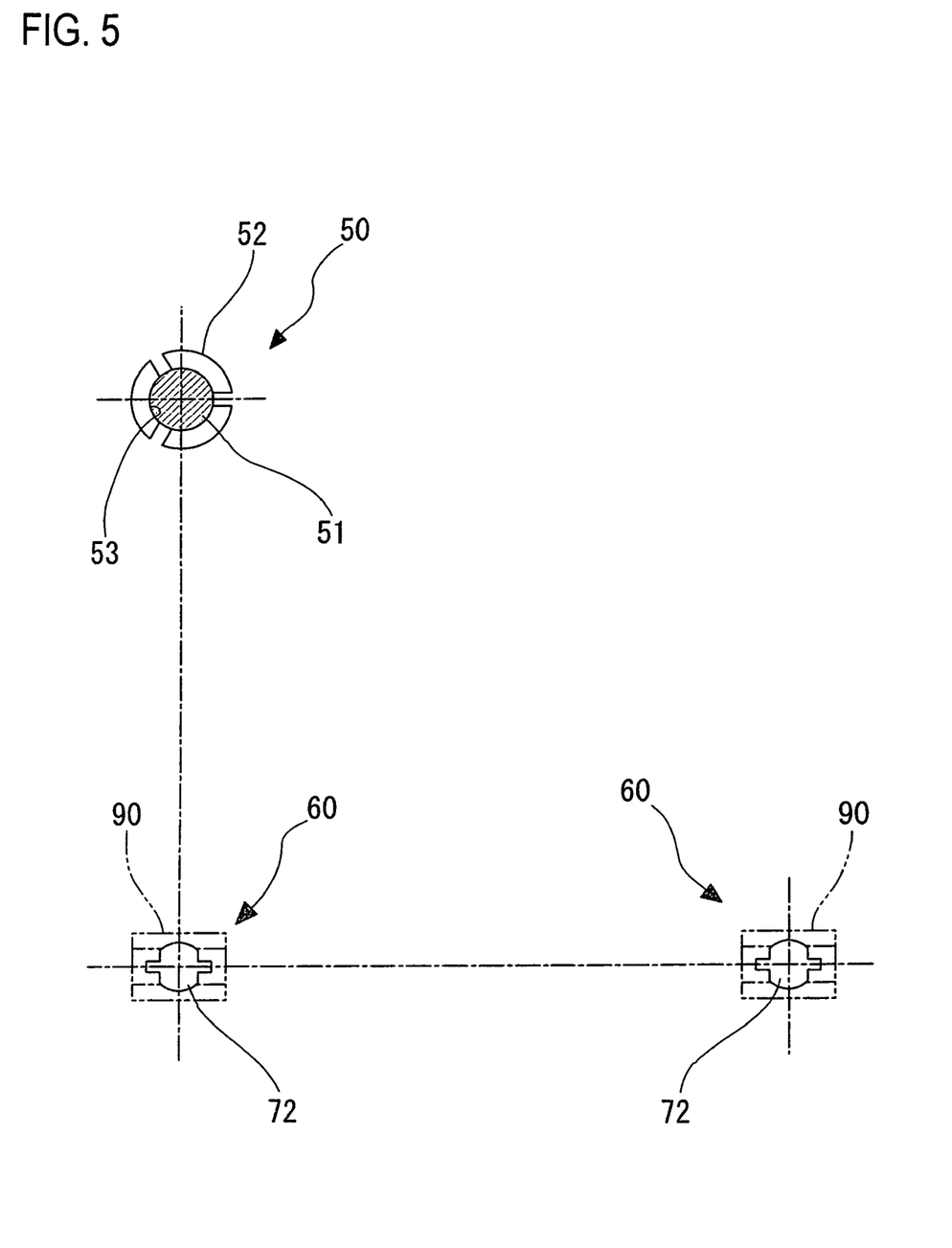
FIG. 5 is a cross-sectional view of yet another arrangement example of the connection between the reflector and the lamp body taken at the same portion as in FIG. 2.
Figure 6:
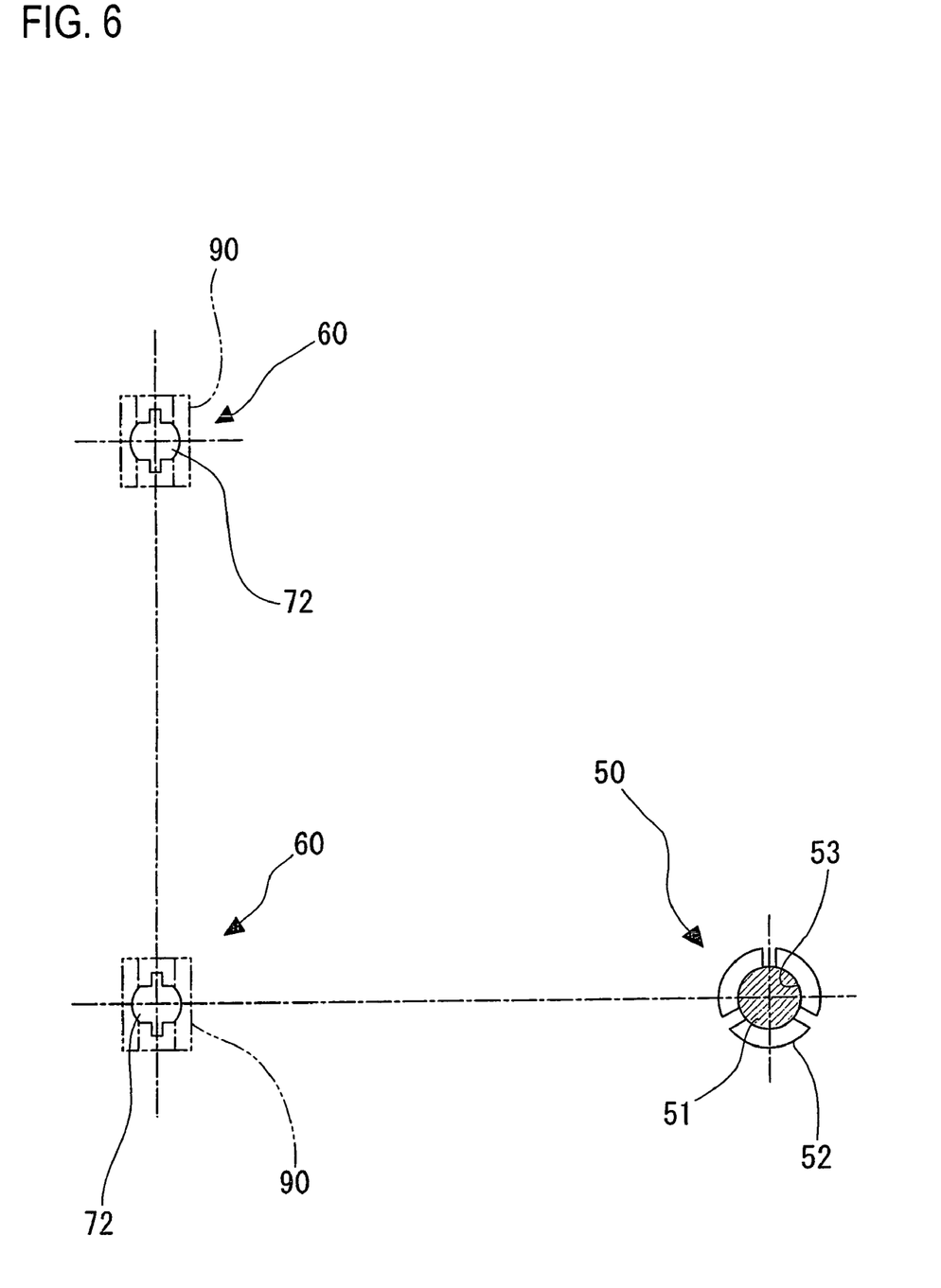
FIG. 6 is a cross-sectional view of still yet another arrangement example of the connection between the reflector and the lamp body taken at the same portion as in FIG. 2.

The arrangement of the three connecting sections is not limited to that shown in FIG. 2, and various other arrangement examples such as those shown in FIG. 4 to FIG. 6 are conceivable.

In the arrangement of the three connecting sections shown in FIG. 4 viewed from the front, the rotational fulcrum section 50 is provided at the lower left and the distance adjustment sections 60 are arranged at the upper left and lower right locations. In the arrangement of FIG. 5 viewed from the front, the rotational fulcrum section 50 is provided at the upper left location, and the distance adjustment sections 60 are provided at the lower left and lower right locations. In FIG. 6 viewed from the front, the rotational fulcrum section 50 is provided at the lower right location, and the distance adjustment sections 60 are provided at the lower left and the upper left locations.

In the arrangement example shown in FIG. 4, the reflector 40 tilts in the vertical direction by adjusting or changing the distance between the reflector 40 and the lamp body 20 at the upper left distance adjustment section 60, and the reflector 40 tilts in the lateral direction by adjusting or changing the distance between the reflector 40 and the lamp body 20 at the lower right distance adjustment section 60. In the arrangement of FIG. 5, the reflector 40 tilts in the lateral direction by adjusting the distance between the reflector 40 and the lamp body 20 at the lower right distance adjustment section 60, and the reflector 40 tilts in the vertical direction by adjusting the distance between the reflector 40 and the lamp body 20 at the lower right and left distance adjustment sections 60 the same amount in the same direction. Further, in the arrangement of FIG. 6, the reflector 40 tilts in the vertical direction by adjusting the distance between the reflector 40 and the lamp body 20 at the upper left distance adjustment section 60, and the reflector 40 tilts in the lateral direction by adjusting the distance between the reflector 40 and the lamp body 20 at the upper and lower left distance adjustment sections 60 the same amount in the same direction.

The rotational fulcrum section 50 is, as shown in FIG. 1, formed by a spherical body 51 fixed to the reflector 40 and a spherical body receiver 52 formed on the lamp body 20. In other words, the spherical body 51 is formed at the rear end of a supporting leg 41 which protrudes from the rear surface of the reflector 40, and the spherical body 51 is received by the spherical body receiver 52 in a rotatable fashion within a spherical concave portion 53 formed in the spherical body receiver 52 of the lamp body 20. The reflector 40 is able to rotate in all directions with respect to the lamp body 20 by the spherical body 51 that rotates inside the spherical concave portion 53.

Figure 7:
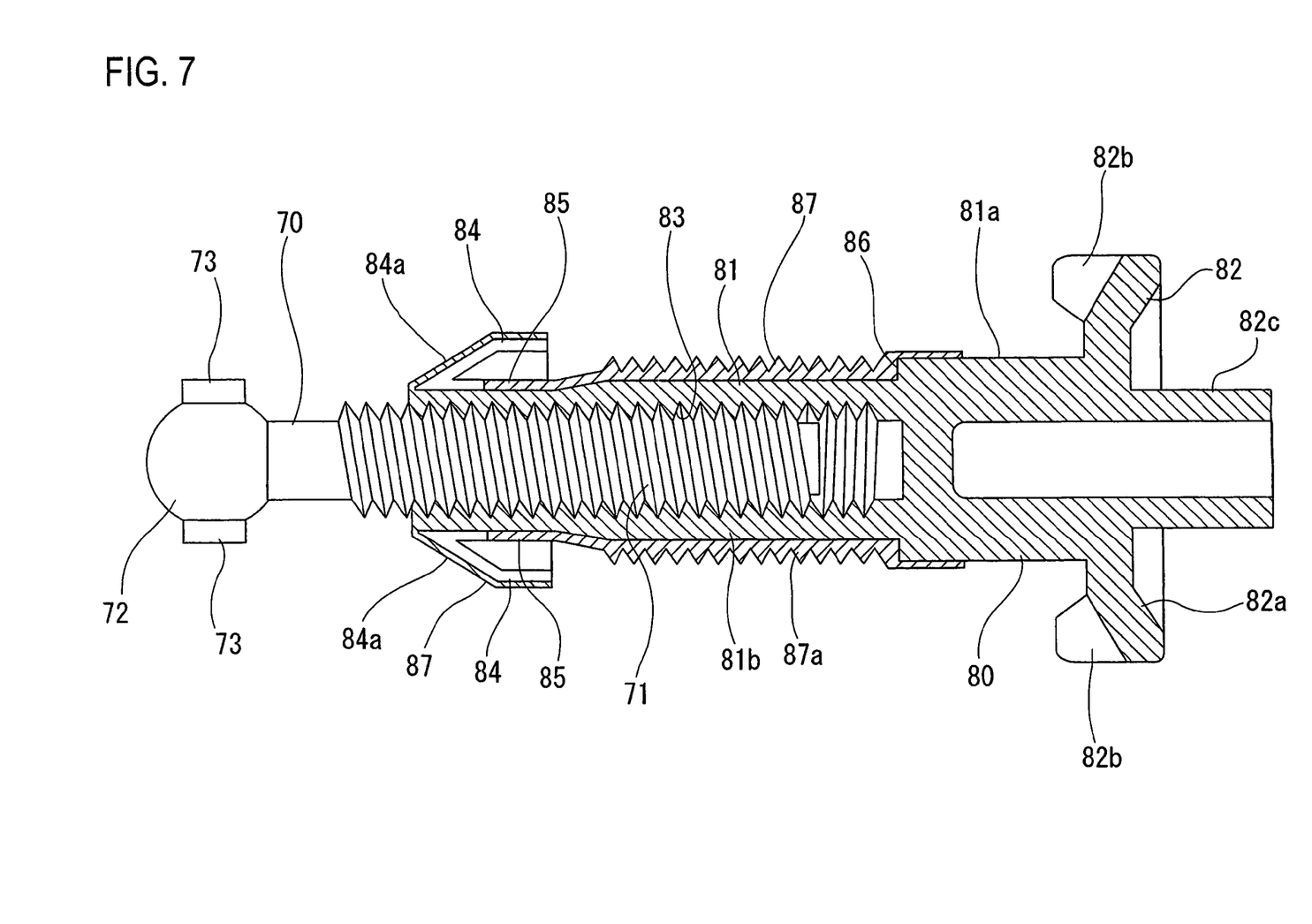
FIG. 7 is an enlarged cross-sectional view of the adjustment shaft and the gear member used in the vehicular lamp of the present invention.

Each of the distance adjustment sections 60 is, as seen from FIG. 7, comprised of an adjustment shaft 70, a gear member 80, and a receiving element 90 (see FIG. 1).

The adjustment shaft 70 comprises a threaded shaft portion 71 and a spherical end portion 72 which is formed (molded) on the front end of the threaded shaft portion 71. The threaded shaft portion 71 and the spherical end portion 72 are integrally formed. Protrusions 73 are integrally formed on the spherical end portion 72 of the adjustment shaft 70 so that the protrusions 73 protrude in a direction substantially orthogonal to the axis of the threaded shaft portion 71. The adjustment shaft 70 is formed of metal, synthetic resin, or a composite molding material in which the synthetic resin is strengthened with glass fiber, inorganic filler, or the like. One example of the composite molding material is polyamide MXD 6 composite molding material known as RENY (registered trademark) made by Mitsubishi Gas Chemical Co., Inc.

The gear member 80 comprises a shaft portion 81 and a gear portion 82 which is integrally molded to the rear end of the shaft portion 81. The shaft portion 81 and the gear portion 82 are integrally formed. The shaft portion 81 is formed with a hole or an internal cylindrical hollow space which is open to the front end thereof, and a thread groove 83 is formed on the inner peripheral surface of this hole or of the cylindrical hollow space. Elastic pawls 84 which protrude at angles toward the back are integrally formed on the outer peripheral surface near the front end of the shaft portion 81. The elastic pawls 84 are, in the shown embodiment, formed at two locations on diametrically opposite sides of the shaft portion 81. In other words, in the shown embodiment, the gear member 80 has two elastic pawls 84. The elastic pawls 84 can be formed at three locations or four or more locations (or the gear member 80 may have three, four or more elastic pawls 84) separated by substantially equivalent distances in the circumferential direction. The front surfaces 84a of the elastic pawls 84 are slanted in the direction toward the axis of the shaft portion 81 as they extend toward the front.

In the outer peripheral surface of the shaft portion 81, two empty spaces 85, which allow flexure of the elastic pawls 84 toward the shaft portion 81, are formed by being defined by the two elastic pawls 84. Accordingly, when the elastic pawls 84 receive external force from the front side, the force acts on the front slanted surfaces 84a, the elastic pawls 84 flex toward the axial center of the shaft portion 81, and ultimately all or almost all of them are positioned in the corresponding empty spaces 85, so that either nothing protrudes from the outer peripheral surface of the shaft portion 81, or a part of the elastic pawls 84 protrudes slightly from the outer peripheral surface of the shaft portion 81.

The shaft portion 81 is formed with a stepped surface 86 that faces the front. The stepped surface 86 is provided near the rear end of the shaft portion 81, so that the rear portion 81a on the rear side of the stepped surface 86 has a larger diameter than the font portion 81b which is on the front side of the stepped surface 86.

The gear flange 82a of the gear portion 82 of the gear member 80 is formed with teeth 82b thereon. The teeth 82b protrude from the entire periphery on the front side of the gear flange 82a which is somewhat a thick disk shape. A rear end portion 82c protrudes toward the back from the gear flange 82b of the gear portion 82. The outer shape of the rear end portion 82c viewed from the back of the gear member 80 is hexagonal.

Of the outer surface of the shaft portion 81 of the gear member 80, the front end of the rear part 81a, the stepped surface 86, the front part 81b which is on the front side of the stepped surface 86, the empty spaces 85, and the inside surfaces of the elastic pawls 84, are covered by a coating 87 made of elastomer. In addition, in the elastomer coating 87, the outer peripheral surface 87a that covers the outer peripheral surface of the front part 81b of the shaft portion 81 is formed wavy. The elastomer coating 87 is formed by integral molding with the gear member 80, when the gear member 80 is formed of a composite molding material such as RENY (registered trademark) described above. As the material elastomer of the coating 87, a thermoplastic polyester elastomer, for instance, can be used. HYTREL (registered trademark) developed by DuPont Inc. of the U.S. is preferable for the thermoplastic polyester used.

The receiving element 90 of the distance adjustment section 60 is integrally formed on the back surface of the reflector 40.

More specifically, as seen from FIG. 2, the receiving element 90 is formed by two wall portions 91, which protrude from the back surface of the reflector 40 and are positioned substantially parallel, and an opening 93, which extends in substantially one direction between eave portions 92 which protrude toward each other from the rear ends of the two wall portions 91. The eave portions 92 are slanted so that they are displaced toward the front as they become close to each other. The reflector 40 described above is formed of FRP (Fiber-Reinforced Plastic). For example, it is formed by transfer molding or by heat molding in which SMC (Sheet Molding Compound), in which a compound such as resin or filling material is impregnated into reinforcing material, and BMC (Bulk Molding Compound), in which that material is mixed, is heated and then compressed by a die. The material of the reflector 40 is of course not limited to FRP. ULTEM resin (ULTEM is a registered trademark of General Electric Company Corporation), which is an amorphous thermoplastic polyetherimide, can be used as a material resin for the reflector 40.

For the above-described gear member 80, an insertion hole 23 which rotatably supports the gear member 80 is, as seen from FIG. 1, formed in the rear wall 22 of the lamp body 20. In the insertion hole 23, a stepped surface 24 which faces the back is formed near the rear end. The rear portion 23a on the rear side of the stepped surface 24 has a larger diameter than the front portion 23b which is on the front side of the stepped surface 24. The inside diameter of the larger diameter portion 23a is made substantially equal to the outside diameter of the rear part 81a of the shaft portion 81 of the gear member 80, and the inside diameter of the smaller diameter portion 23b is made substantially equal to the outside diameter of the front part 81b on the front side of the stepped surface 86 of the shaft portion 81.

The gear member 80 is installed in the lamp body 20 in a rotatable fashion in the manner described below.

The threaded shaft portion 71 of the adjustment shaft 70 is first screwed into the thread groove 83 of the inner peripheral surface of the shaft portion 81 of the gear member 80 up to a predetermined position in advance; and then the shaft portion 81 of the gear member 80 inserted into the insertion hole 23 of the lamp body 20 from the back of the lamp body 20. When the tip end of the shaft portion 81 is inserted in the smaller diameter portion 23b of the insertion hole 23, the rear side open edge of the smaller diameter portion 23b of the insertion hole 23 abuts against the front slanted surfaces 84a of the elastic pawls 84 of the shaft portion 81.

The shaft portion 81 is then pushed further forward or deeper, so that the rear side open edge of the smaller diameter portion 23b pushes against the front slanted surfaces 84a of the elastic pawls 84, and the elastic pawls 84 flex and shift toward the axial center of the shaft portion 81 and are positioned in the empty spaces 85 formed on the outer peripheral surface of the shaft portion 81. When most of the elastic pawls 84 are positioned in the empty spaces 85 or become flat, nothing protrudes from the outer peripheral surface of the front part 81b of the shaft portion 81 (as in the case where the elastic pawls 84 are positioned entirely in the empty spaces 85 or become entirely flat), or the elastic pawls 84 slightly protrude (as in the case where most of the elastic pawls 84 are positioned in the empty spaces 85 or the elastic pawls 84 mostly become flat); as a result, the front part 81*b* of the shaft portion 81 enters up to the front end of the smaller diameter portion 23*b* of the insertion hole 23 of the lamp body 20.

When the shaft portion 81 is inserted into the insertion hole 23 until the stepped surface 86 abuts against the stepped surface 24 of the insertion hole 23, the rear ends of the elastic pawls 84 pop out on the front side of the insertion hole 23, and the elastic pawls 84 return to their original shapes by their elasticity and are positioned on the front side of the insertion hole 23. As a result, a rearward movement of the shaft portion 81 is prevented by the engagement of the elastic pawls 84 with the front side open edge of the insertion hole 23; and a forward movement of the shaft portion 81 is also prevented by the stepped surfaces 86 and 24 abutting against each other. Accordingly, the shaft portion 81 of the gear member 80 is rotatably installed so that the gear member 80 is prevented from slipping out of the insertion hole 23. The elastomer coating 87 on the outer peripheral surface of the shaft portion 81 is provided between the shaft portion 81 and the inner peripheral surface of the insertion hole 23, and thus an assured water-proof capability is obtained between the shaft portion 81 of the gear member 80 and the insertion hole 23 of the reflector 40.

As described above, when the reflector 40 is pushed to the back with the gear member 80 rotatably set in the lamp body 20 and the spherical end portion 72 of the adjustment shaft 70 aligned with the opening 93 of the receiving element 90, the spherical end portion 72 of the adjustment shaft 70 abuts against the front slanted surfaces 84*a* of the eave portions 92 and pushes on the eave portions 92. As a result, the wall portions 91 flex slightly apart from one another so that the spherical end portion 72 passes through the opening 93 and becomes positioned inside the empty space surrounded by the wall portions 91 and the eave portions 92, i.e., within the receiving element 90. The spherical end portion 72 is prevented by the eave portions 92 from slipping out of the receiving element 90.

Assembly of the reflector 40 to the lamp body 20 at each one of the distance adjustment sections 60 is performed as described above. In other words, by first having the adjustment shafts 70 screwed into the gear members 80 up to the predetermined positions, and by aligning the spherical body 51 of the reflector 40 with the spherical body receiver 52 of the lamp body 20, and then by aligning the receiving elements 90 of the reflector 40 with the spherical end portions 72 of the two adjustment shafts 70, the reflector 40 is installed in the lamp body 20 when the reflector 40 is pushed toward the back. Therefore, there is no need to screw the adjustment shafts 70 into the gear members 80 at the assembly site of the reflector, making the assembly site of the reflector simpler and making the assembly work easier, which in turn reducing the costs of the vehicular lamp.

The gear member 80 can be obtained by integrally molding the adjustment shaft 70 and the gear member 80 by insert molding in which the molding material of the gear member 80 is injected while at least a part of the threaded shaft portion 71 of the adjustment shaft 70 is set in the molding die for the gear member 80. By this insert molding, the operation of screwing the adjustment shaft 70 into the gear member 80 prior to the assembling of the reflector 40 to the lamp body 20 is unnecessary, thus improving the workability of the assembly of the vehicular headlamp.

When the adjustment shaft 70 and the gear member 80 are integrally molded, the adjustment shaft 70 must be made metal, or it must be made of a material that is more rigid than the material used for the gear member 80. For example, it is possible to form both adjusting portion 70 and gear member 80 with a composite molding material such as RENY (RENY is a registered trademark of Mitsubishi Gas Chemical Company Inc.) described above; but it is necessary to use a composite molding material, which is more rigid than the molding material for the gear member 80, for the material for the adjustment shaft 70.

After the insert molding of the gear member 80 and the adjustment shaft 70, the threaded shaft portion 71 of the adjustment shaft 70 is separated from the thread groove 83 of the gear member 80 by rotating the adjustment shaft 70 relative to the gear member 80, so that they can both function as independent members.

In the vehicular headlamp 10 described above, the reflector 40 is tilted in a desired direction by turning the desired gear member 80.

More specifically, when the gear member 80 is rotated, relative rotation occurs between the thread groove 83 of the gear member 80 and the threaded shaft portion 71 of the adjustment shaft 70, and the adjustment shaft 70 moves in the axial direction. Frictional force operates between the thread groove 83 of the gear member 80 and the threaded shaft portion 71 of the adjustment shaft 70, causing the adjustment shaft 70 to rotate by the rotation of the gear member 80. However, the protrusions 73 formed on the spherical end portion 72 of the adjustment shaft 70 abut against (and engaged with or interfere with) the wall portions 91 of the receiving element 90 formed on the reflector 40. As a result, the adjustment shaft 70 is prevented from rotating.

The above-described rotation of the gear member 80 is made by a Phillips-head screwdriver 100. In other words, as seen from FIG. 1, a tip end 101 of the Phillips-head screwdriver 100 is set between the rear wall 22 of the lamp body 20 and the gear portion 82 of the gear member 80, and the tip end 101 and the teeth 82*b* of the gear portion 82 are brought into mesh with each other. Then, when the Phillips-head screwdriver 100 is turned, the teeth 82*b* of the gear portion 82 is driven and rotated by the tip end 101 of the Phillips-head screwdriver 100, and the gear member 80 is rotated. The gear member 80 can be rotated by other types of screwdrivers than the Phillips-head screwdriver.

As seen from FIG. 2, the wall portions 91 of the receiving element 90 at the upper left distance adjustment section 60 are formed so that they extend in the lateral direction, and the wall portions 91 of the receiving element 90 at the lower right distance adjustment section 60 are formed so that they extend in the vertical direction. Therefore, in the upper left distance adjustment section 60, the spherical end portion 72 of the adjustment shaft 70 can be moved in the lateral direction relative to the receiving element 90; and in the lower right distance adjustment section 60, the spherical end portion 72 can be moved in the vertical direction relative to the receiving element 90.

Of the three connecting sections 50, 60 and 60 described above, only the position of the rotational fulcrum section 50 is fixed; as a result, the receiving elements 90 which are for the two connecting sections 60 are moved (in an arc) by the tilting motion of the reflector 40, and deviation occurs between the adjustment shafts 70 that extend linearly. This deviation becomes deviation in the lateral direction at the receiving element 90 positioned apart in the lateral direction from the rotational fulcrum section 50, and becomes deviation in the vertical direction at the receiving element 90 positioned apart in the vertical direction from the rotational fulcrum section 50. Smooth tilting of the reflector 40 can be made by absorbing the deviation between the direction in which the adjustment shafts 70 extend and the trajectory of travel of the receiving elements 90 by moving the spherical end portions 72 relative to the receiving elements.

In the above description, in order to obtain the waterproof capability between the gear member 80 and the insertion hole 23 of the lamp body 20, the elastomer coating 87 is formed for the large area of the outer peripheral surface of the shaft portion 81 of the gear member 80. However, an assured water-proof capability between the gear member 80 and the insertion hole 23 of the lamp body 20 can be obtained by the arrangements shown in FIG. 8 and FIG. 9.

Figure 8:
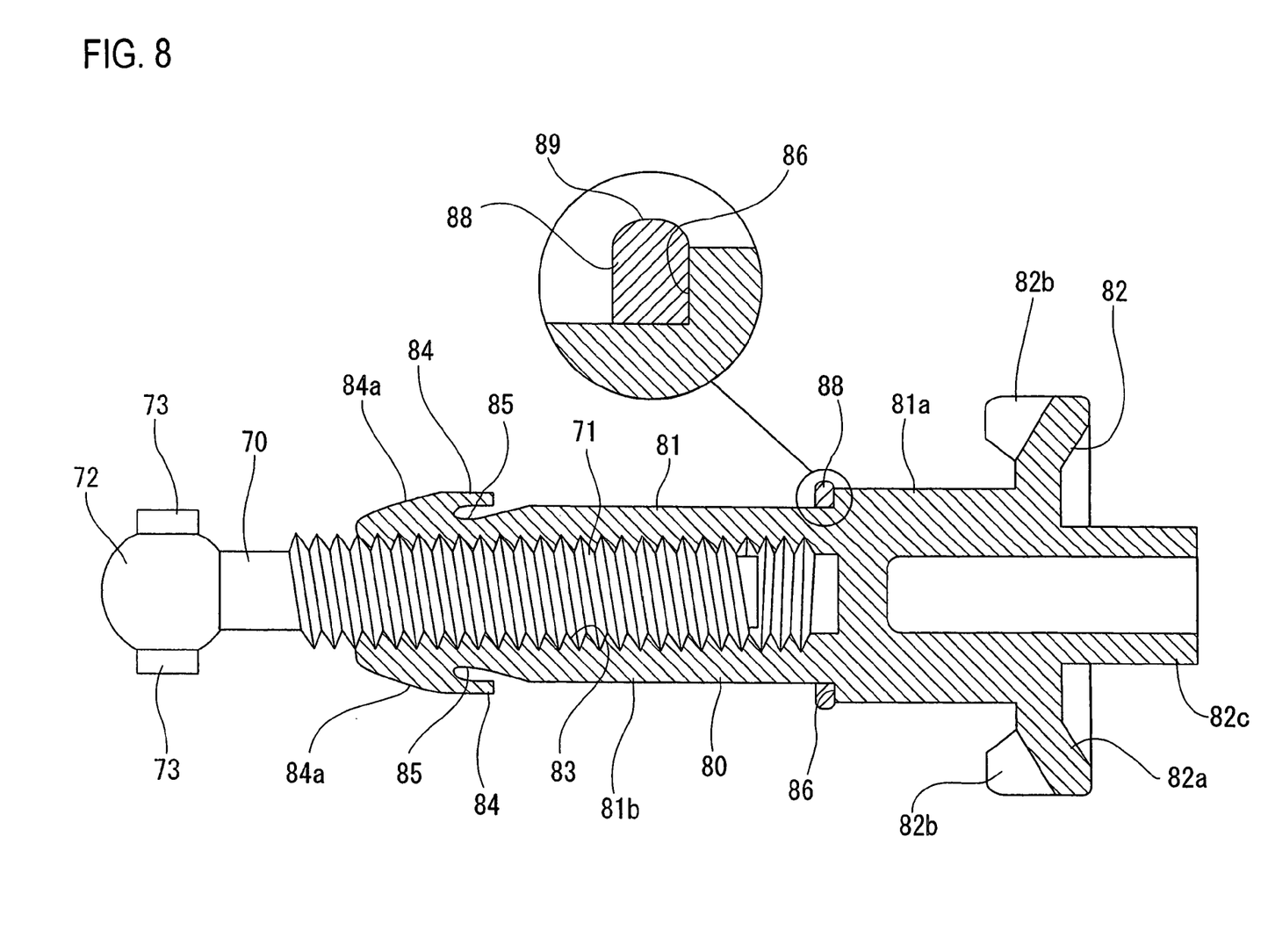
FIG. 8 is an enlarged cross-sectional view of another example of the adjustment shaft and the gear member used in the vehicular lamp of the present invention.

In FIG. 8, a seal body 88 made from an elastomer is formed by being integrally molded along the entire periphery of the stepped surface 86 of the gear member 80, thus being in a ring shape, so that it is in contact with the entire stepped surface 86. The outer diameter of the seal body 88 is formed slightly larger than the diameter of the rear part 81a of the shaft portion 81, and the outer peripheral surface 89 is formed in an arc shape. As a result, when the gear member 80 that has the thus formed seal body 88 is inserted in the insertion hole 23 of the lamp body 20, the outer peripheral surface 89 of the seal body 88 reliably makes close contact with the inner peripheral surface of the large r diameter portion 23a and stepped surface 24 of the insertion hole 23, and an assured water-proof capability between the gear member 80 and the insertion hole 23 is obtained.

FIGS. 9A through 9D show several modified examples of the seal body of FIG. 8.

Figure 9A:
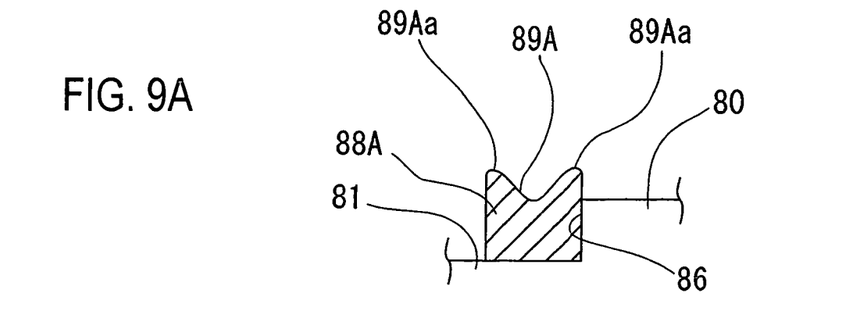
FIGS. 9A through 9D are enlarged cross-sectional views of modified examples of the gear member shown in FIG. 8.

In the seal body 88A shown in FIG. 9A, a V-shaped groove is formed in the outer peripheral surface 89A, and thus two ribs 89A*a* are formed on the front and back sides of the outer peripheral surface 89A. The ribs 89A*a* assures close contact of the seal body 88A with the larger diameter portion 23a of the insertion hole 23 of the lamp body 20.

Figure 9B:
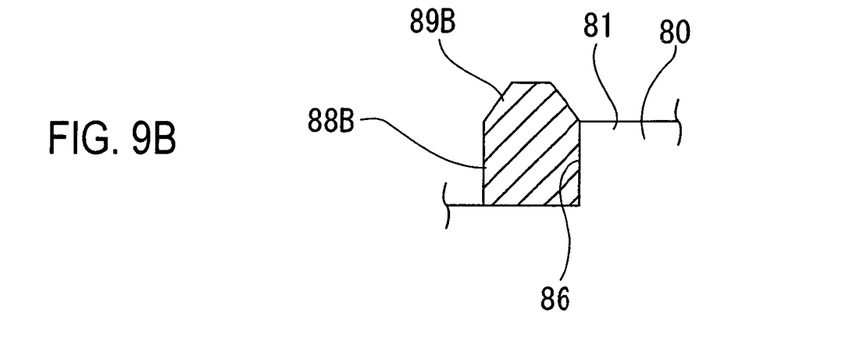

In the seal body 88B shown in FIG. 9B, the outer peripheral surface 89B is formed in an angled mountain shape. The mountain-shaped outer peripheral surface 89B assures close contact of the seal body 88B with the larger diameter portion 23a of the insertion hole 23 of the lamp body 20.

Figure 9C:
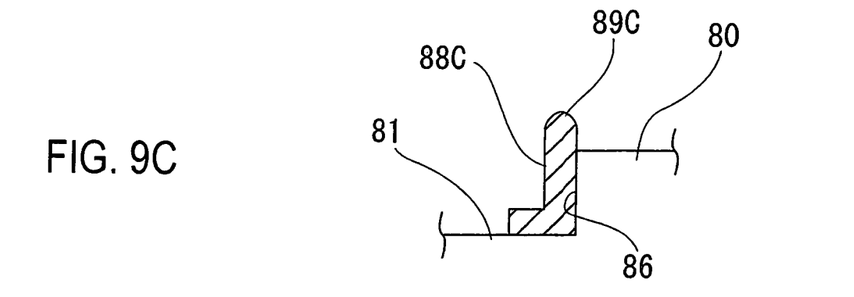

The seal body 88C shown in FIG. 9C has an L-shaped cross-section and is formed thick overall. The outer peripheral portion 89C of the seal body 88C protrudes outward to pass the rear part 81a of the shaft portion 81, and it has a sufficient flexibility. Thus, the outer peripheral portion 89C of the seal body 88C assures close contact of the seal body 88C with the larger diameter portion 23a of the insertion hole 23 of the lamp body 20.

Figure 9D:
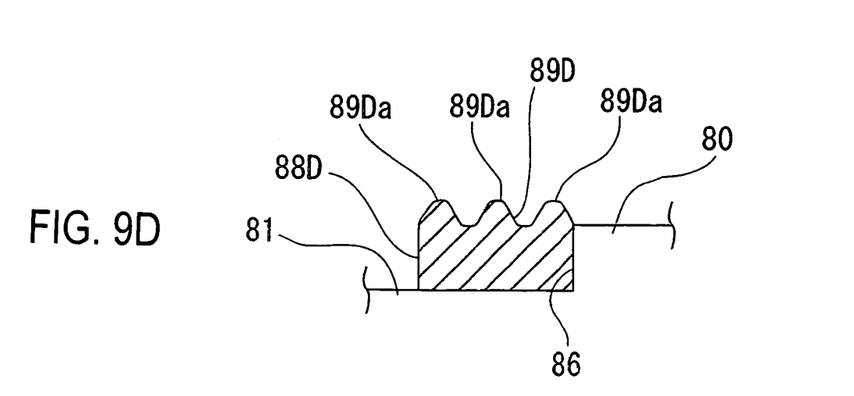

In the seal body 88D shown in FIG. 9D, three ribs 89Di a, 89D*a* and 89D*a* are formed on its outer peripheral surface 89D. The three ribs 89D*a*, 89D*a* and 89D*a* assures close contact of the seal body 88D with the larger diameter portion 23a of the insertion hole 23 of the lamp body 20.

Figure 10:
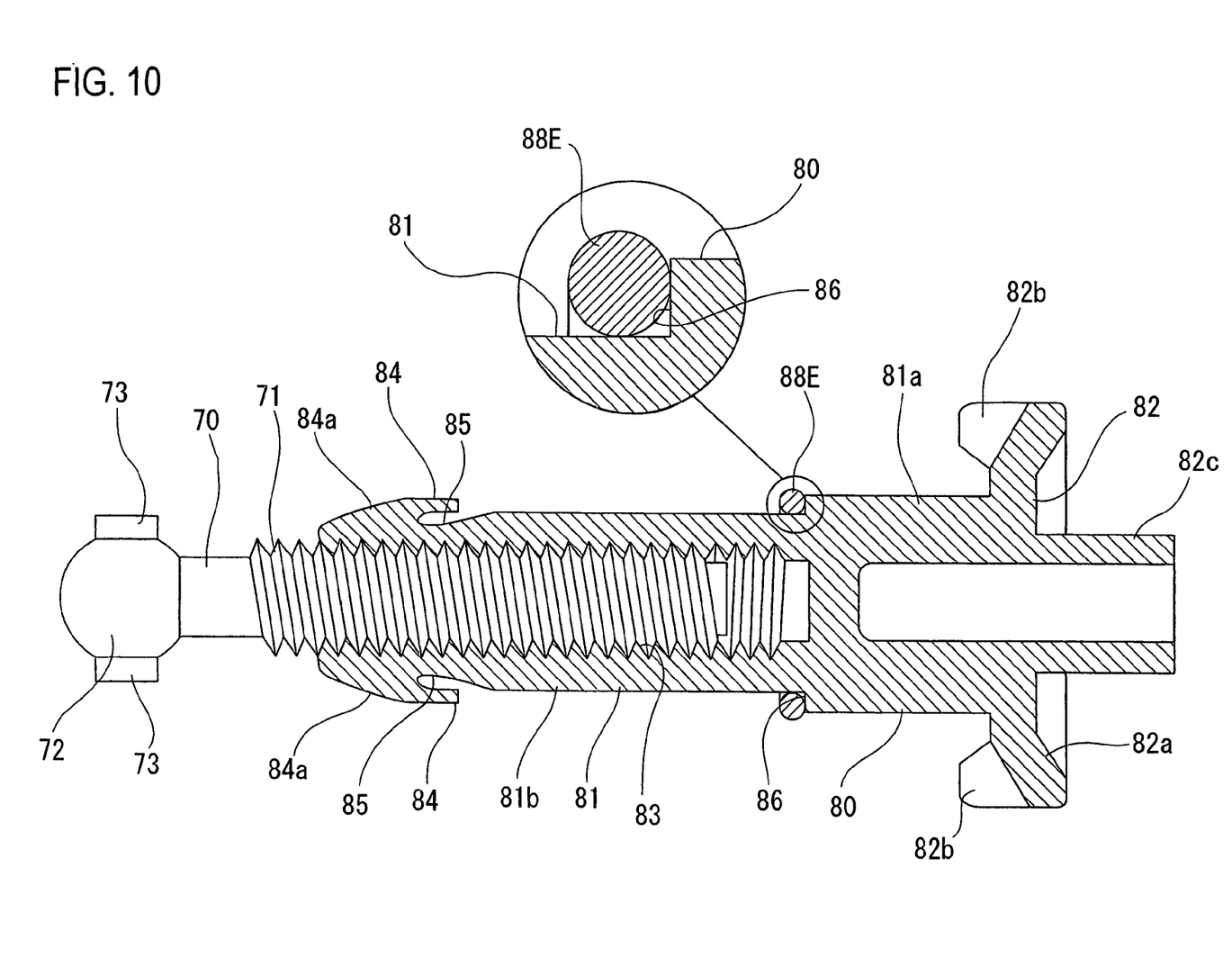
FIG. 10 is an enlarged cross-sectional view of yet another example of the adjustment shaft and the gear member used in the vehicular lamp of the present invention.

In each of the gear members 80 described above, the elastomer is integrally molded; however, the elastomer can be molded not in an integral fashion. In other words, as shown in FIG. 10, an O-ring 88E can be used so that it is fitted on the front side of the stepped surface 86 of the shaft portion 81 of the gear member 80. When the gear member 80 having the O-ring 88E is installed in the lamp body 20, the O-ring 88E is compressed between the stepped surface 86 of the gear member 80 and the stepped surface 24 of the insertion hole 23 of the lamp body 20. As a result, an assured water-proof capability between the gear member 80 and the insertion hole 23 is obtained.

The foregoing embodiments are mere specific examples for carrying out the present invention, and the technical scope of the present invention should not be construed as being limited by the described embodiments.

As seen from the above descriptions, the present invention is employed for various types of vehicular lamps in which the direction of radiation of the light is adjusted by tilting the reflector.

The invention claimed is:

1. A vehicular lamp comprising a container-shaped lamp body, a lens that covers a front face of the lamp body, a reflector which has a light source and is provided between the lamp body and the lens, and an aiming mechanism that tiltably supports the reflector with respect to the lamp body, wherein the aiming mechanism comprises at least one rotational fulcrum section and at least one distance adjustment section, the reflector is provided in the lamp body so as to be rotatable at the rotational fulcrum section, and the reflector and the lamp body are connected such that a distance therebetween is adjustable at the distance adjustment section, the distance adjustment section is comprised of an adjustment shaft, a gear member, and a receiving element, in which the adjustment shaft is comprised of a threaded shaft portion and a spherical end portion formed on a tip end of the threaded shaft portion, the gear member is comprised of:
  a shaft portion which is open at a front end thereof and in which a thread groove that meshes with the threaded shaft portion of the adjustment shaft is formed internally,
  a gear portion which is formed on a rear end of the shaft portion,
  at least two elastic pawls which protrude from an outer peripheral portion of the shaft portion, and
  an empty space which is defined by the pawl and formed on the shaft portion so as to allow flexure of the elastic pawls in a direction toward the shaft portion, and the receiving element is formed on a back surface of the reflector; and wherein the gear member is rotatably inserted in an insertion hole formed in the lamp body with the threaded shaft portion of the adjustment shaft meshed with the thread groove of the shaft portion, and with the elastic pawls engaged with the front end edge of the insertion hole, thus preventing the gear member from slipping out of the lamp body;

the spherical end portion of the adjustment shaft is received by the receiving element so that the spherical end portion is prevented from rotating about an axis of the threaded shaft portion, the reflector is formed of a material having elasticity;

the receiving element of the reflector is comprised of two wall portions, which protrude from the back surface of the reflector and positioned substantially parallel to each other, and an opening, which extends in substantially one direction and is fanned between eave portions that protrude toward each other from a rear end of the two wall portions;

the spherical end portion of the adjustment shaft is formed with at least two protrusions which protrude in a direction intersecting the axis of the threaded shaft portion; and the spherical end portion is received by the receiving element trough the opening between the two wall portions, and the protrusions of the spherical end portion are engaged with the wall portions.

2. The vehicular lamp according to claim 1, wherein the shaft portion of the gear member is integrally provided on an outer peripheral surface thereof with a coating formed from an elastomer.

3. The vehicular lamp according to claim 2, wherein
the shaft portion of the gear member is formed near a rear end thereof with a stepped surface which faces forward of the gear member, the stepped surface extending an entire periphery of the shaft portion, and
the stepped surface is provided thereon with an O-ring so that the o-ring is in contact with the stepped surface.

4. A vehicular lamp comprising a container-shaped lamp body, a lens that covers a front face of the lamp body, a reflector which has a light source and is provided between the lamp body and the lens, and an aiming mechanism that tiltably supports the reflector with respect to the lamp body, wherein
the aiming mechanism comprises at least one rotational fulcrum section and at least one distance adjustment section,
the reflector is provided in the lamp body so as to be rotatable at the rotational fulcrum section, and
the reflector and the lamp body are connected such that a distance therebetween is adjustable at the distance adjustment section,
the distance adjustment section is comprised of an adjustment shaft, a gear member, and a receiving element, in which
the adjustment shaft is comprised of a threaded shaft portion and a spherical end portion formed on a tip end of the threaded shaft portion,
the gear member is comprised of:
a shaft portion which is open at a front end thereof and in which a thread groove that meshes with the threaded shaft portion of the adjustment shaft is formed internally,
a gear portion which is formed on a rear end of the shaft portion,
at least two elastic pawls which protrude from an outer peripheral portion of the shalt portion, and
an empty space which is defined by the pawl and formed on the shaft portion so as to allow flexure of the elastic pawls in a direction toward the shaft portion, and
the receiving element is formed on a back surface of the reflector; and wherein
the gear member is rotatably inserted in an insertion hole formed in the lamp body with the threaded shaft portion of the adjustment shaft meshed with the thread groove of the shaft portion, and with the elastic pawls engaged with the front end edge of the insertion hole, thus preventing the gear member from slipping out of the lamp body;
the spherical end portion of the adjustment shaft is received by the receiving element so that the spherical end portion is prevented from rotating about an axis of the threaded shaft portion,
the shaft portion of the gear member is formed near a rear end thereof with a stepped surface which faces forward of the gear member, the stepped surface extending an entire periphery of the shaft portion, and
the stepped surface is integrally provided thereon with a seal body formed from an elastomer so that the seal body is in contact with the stepped surface.

5. The vehicular lamp according to claim 4, wherein
the adjustment shaft is formed of metal or a resin material which differs from a resin material for the gear member, and
the adjustment shaft and the gear member are integrally formed by insert molding in which a material resin for the gear member is injected with at least a portion of the threaded shaft portion of the adjustment shaft inserted in a molding die for the gear member.

* * * * *

UNITED STATES PATENT AND TRADEMARK OFFICE
CERTIFICATE OF CORRECTION

PATENT NO. : 7,207,704 B2 Page 1 of 1
APPLICATION NO. : 11/265012
DATED : April 24, 2007
INVENTOR(S) : Takeyuki Tachiiwa et al.

It is certified that error appears in the above-identified patent and that said Letters Patent is hereby corrected as shown below:

Title page, Item [75] Inventors:

Change "Manbu Maeda" to --MANABU MAEDA--

Signed and Sealed this

Thirtieth Day of June, 2009

JOHN DOLL
*Acting Director of the United States Patent and Trademark Office*